United States Patent [19]

Greenfield et al.

[11] 4,354,376
[45] Oct. 19, 1982

[54] KIT FOR CALIBRATING PIPETTES

[75] Inventors: Walter Greenfield, Ardsley; Didya D. Levy, Brooklyn; Richard E. Scordato, Scarsdale; John J. Hartnett, Yonkers, all of N.Y.

[73] Assignee: Medical Laboratory Automation, Inc., Mount Vernon, N.Y.

[21] Appl. No.: 126,718

[22] Filed: Mar. 3, 1980

[51] Int. Cl.$^3$ ............................................. G01F 25/00
[52] U.S. Cl. ................................. 73/1 H; 356/243; 422/61; 422/75
[58] Field of Search ............. 73/1 R, 1 H, 3, 424.4 P, 73/425.6, 429, 864.01; 422/68, 61, 100, 75, 76, 77; 23/230 R; 356/36, 243, 256, 42

[56] References Cited

U.S. PATENT DOCUMENTS

| | | | |
|---|---|---|---|
| 1,914,322 | 6/1933 | Bickley | 356/243 X |
| 3,682,597 | 8/1972 | Husch | 422/61 X |
| 3,884,637 | 5/1975 | Gindler | 23/230 B |
| 3,951,313 | 4/1976 | Coniglione | 73/425.6 X |
| 4,195,059 | 3/1980 | Whitcher et al. | 422/61 |

OTHER PUBLICATIONS

ASTM, "Manual on Recommended Practices in Spectrophotometry," Second Edition, 12/66, pp. 90 & 91.
Zavodny et al., Chemical Abstracts, vol. 63, 1965, No. 15518g.
La Motte Chemical Products Co.–Service Bulletin, Towson, Baltimore.

*Primary Examiner*—Arnold Turk
*Attorney, Agent, or Firm*—William P. Keegan

[57] ABSTRACT

A pipette calibration kit containing a plurality of solutions, each of a predetermined concentration, which are used for plotting a calibration curve, and at least one reagent of a predetermined concentration which is used to replace an identical quantity of diluent in a predetermined volume of the diluent. The concentration of the reagent-diluent mixture is measured and the quantity of the reagent substituted for diluent in the reagent-diluent mixture, i.e., the volume of the pipette used to add the reagent to the diluent, is determined from the calibration curve.

14 Claims, 3 Drawing Figures

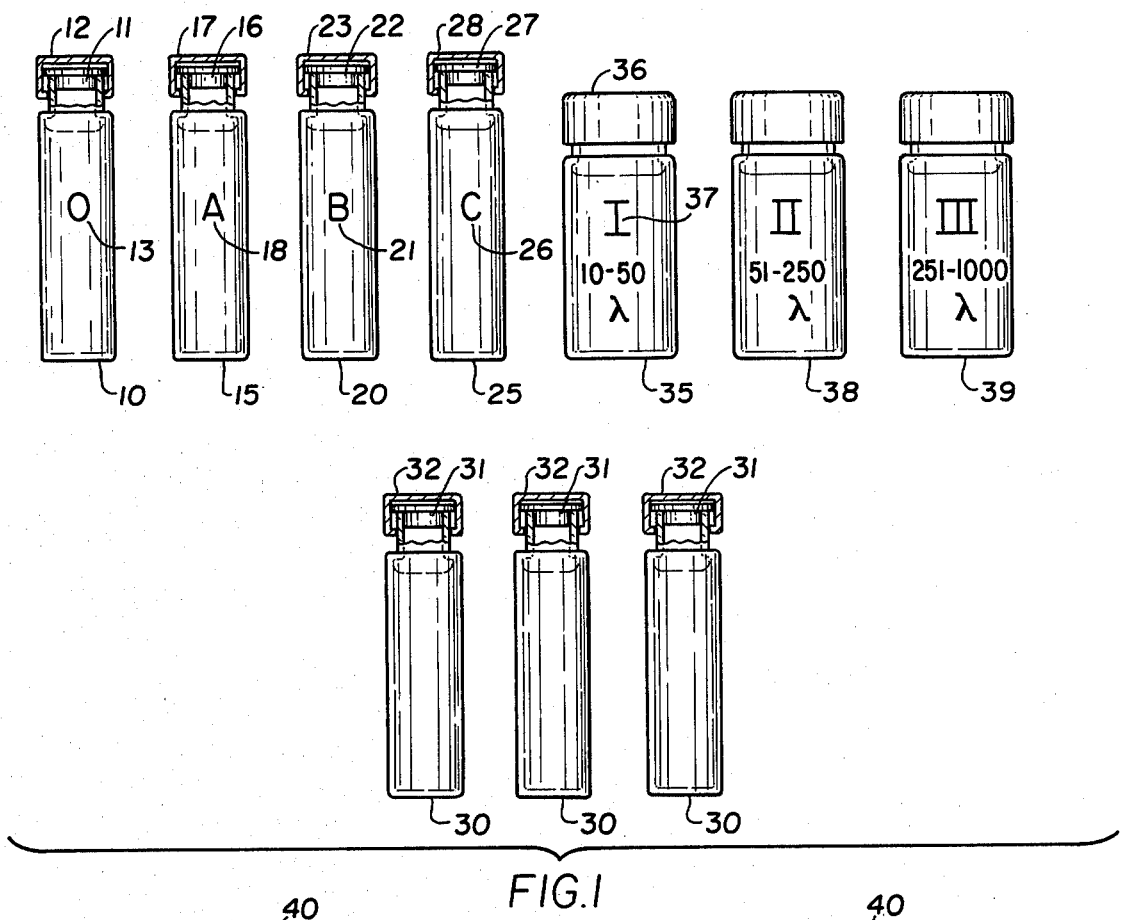
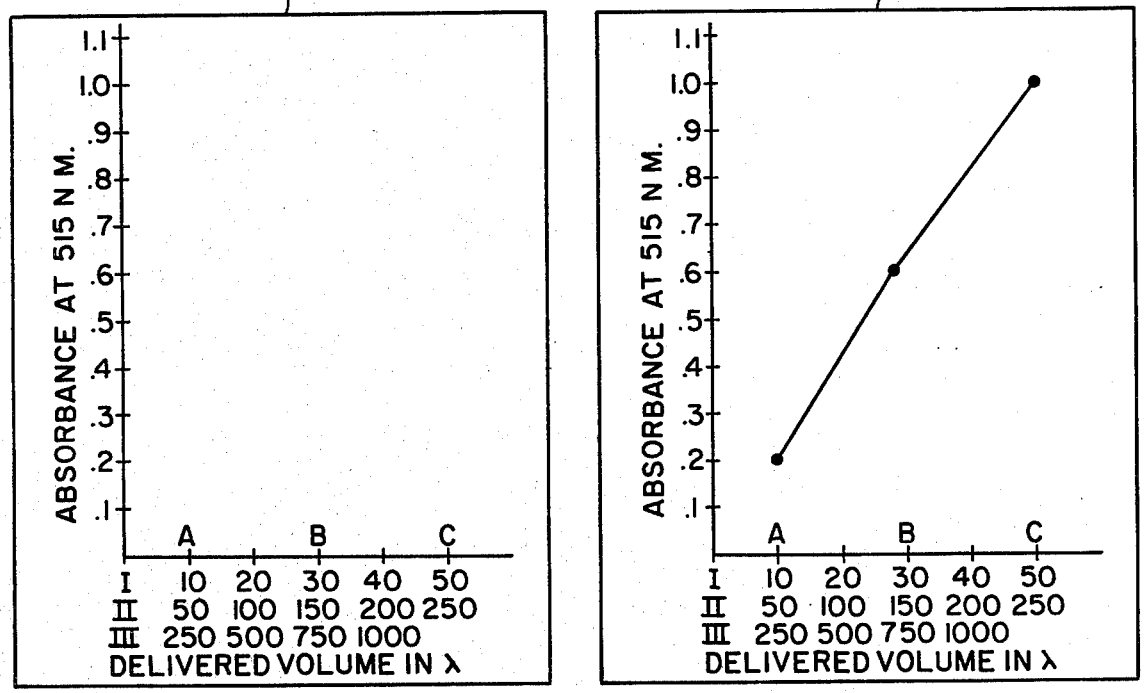
FIG.1
FIG.2
FIG.3

KIT FOR CALIBRATING PIPETTES

The invention relates to means for calibrating pipettes, especially mechanical pipettes in which a liquid is aspirated into a disposable reservoir or tip.

In addition to mouth pipettes, there are in use mechanical pipettes which generally employ a piston and cylinder arrangement for drawing a liquid into a reservoir portion of the pipette or into a disposable tip attached to the pipette in an air-tight manner. In such pipettes, a piston of a certain diameter is moved a predetermined distance or stroke so that a known volume of air is displaced from the pipette reservoir or tip. On the return stroke of the piston, a corresponding volume of liquid is drawn into the reservoir. The piston stroke may be fixed by the construction of the pipette, as in the case of a single volume pipette, or it may be adjustable over a fairly wide range by the user thereof in the case of a multi-volume pipette. In both type pipettes, a calibrating adjustment means may be provided to allow the user to provide a small variation of the stroke from the nominal volume setting of the pipette. Such calibrating adjustment means would be useful to the pipette user in adapting the pipette to different liquids which might have different flow characteristics that would cause different residual amounts of liquid to be left in the reservoir after the major volume of liquid is expelled therefrom. It would also be useful in fixing the exact volume capacity of the pipette. Other mechanical arrangements are used, but not as frequently as the piston and cylinder arrangement, for drawing a liquid into a pipette or into a disposable tip fitted thereto. For example, a peristaltic pump type construction may be used.

It is clear that the exact volume of liquid drawn into a pipette reservoir is dependent on the precision of the mechanical construction of the pipette, or on the accuracy with which the user makes the nominal volume setting in a multi-volume pipette, or on the setting of the calibrating adjustment means. Inasmuch as pipettes are instruments used for the transfer of precise volumes of liquid, they are checked periodically to determine the exact volume of liquid they, in fact, do transfer.

Methods for checking the transfer volume of pipettes are gravimetrical, isotopical, and colorimetrical. The first two mentioned methods are each costly and time consuming. On the other hand, the colorimetric method is inexpensive and quick. The colorimetric method is carried out in accordance with Beer's Law, which can be stated briefly as follows. If two solutions of the same substance be made in the same solvent, one of which is twice the concentration of the other, the absorption of light due to a given thickness of the first solution should be equal to that of twice the thickness of the second solution.

Heretofore, in effecting a colorimetric calibration of a pipette, it was first necessary for the technician to prepare a standard test solution using calibrated instruments. Then, using calibrated glass pipettes or burettes, dilutions of the test solution are prepared and the adsorption thereof measured and compared to the adsorption measured when identical dilutions are prepared using the pipette being calibrated. Clearly, the accuracy of the calibration depends on the care which the technician prepares the test solution and makes the dilutions thereof. And each technician performs at his own level of competence. Therefore, it may be said that there is no universal standard for calibrating pipettes, even though a general colorimetric method exists for performing this task. Also, it should be noted that the existing method requires the use of calibrated instruments to prepare the test solution and dilutions for measurement.

It is the object of the present invention to provide an improved means for calibrating pipettes.

It is another object of the invention to provide improved means for calibrating pipettes by the colorimetric method.

Still another object of the invention is to obviate the need for calibrated instruments when calibrating pipettes by the colorimetric method.

In carrying out the invention, a kit is provided comprising a vial of a standard calibration solution of a first predetermined color density, a vial of a standard calibration solution of a second predetermined color density, a vial of a standard calibration solution of a third predetermined color density, a calibration vial containing a predetermined volume of a diluent, and one or more vials or bottles, each containing a solution of a calibration reagent of a different color density. The kit may also contain a pipette calibration chart on which spectrophotometer readings of the light adsorption by the solutions in the standard calibration vials are plotted to provide a reference curve can be used to determine the volume of the calibration reagent pipetted into a calibration vial to replace an equal volume of diluent removed therefrom. That volume is the volume of the pipette being calibrated.

Features and advantages of the invention may be gained from the foregoing and from the description of a preferred embodiment of the invention which follows.

In the drawing:

FIG. 1 is a schematic illustration of the various test solutions provided in the pipette calibration kit according to the present invention;

FIG. 2 is an illustration of a chart which is used in conjunction with the pipette calibration kit; and FIG. 3 is an illustration of the FIG. 2 chart with test data plotted thereon.

Reference is now made to the drawing and particularly to FIG. 1 thereof. A plurality of vials or cuvettes are provided in the pipette calibration kit, and those illustrated in FIG. 1 will enable a technician to calibrate the transfer capacity or volume of a pipette colorimetrically. Vial 10 is made of clear glass or other material that is non-adsorptive of the radiant energy of the particular wavelength that will be utilized in the spectrophotometric procedure hereinafter disclosed. The vial is dimensioned such that it will be usable in a spectrophotometer such, for example, as the Coleman 6/20A Junior series spectrophotometer. Vial 10 is filled with a clear, non-adsorptive diluent that is relatively stable and will dissolve the dye used in preparing the colored solutions hereinafter disclosed. A 10% methyl alcohol solution is preferred. A stopper 11 and a sealing cap 12 are provided to ensure that the vial will not be opened and the contents contaminated or otherwise affected to alter the energy absorptive characteristics of the diluent. The vial will be marked or labeled with an indicia 13, and since this particular vial and its contents are intended to permit the zero setting of the spectrophotometer, the indicia "0" is preferred. Of course, a different system of marking vial 10, and the other vials hereinafter described, could be used.

Vial 15 is similar to vial 10 except that it is filled with a calibration solution containing a standard dye dissolved in the same diluent with which vial 10 is filled.

The color density of the solution in vial 15 will be predetermined so that it will give an absorption reading of less than 1.0 on a spectrophotometer. Vial 15 is also provided with a stopper 16 and a sealing cap 17. For purposes of this description, the solution in vial 15 is, except for the diluent in vial 10, the least color dense of the solutions in the standard calibration vials. Vial 15 will be marked with an indicia 18 which according to this description will be "A".

Another vial 20 is similar to vials 10 and 15 except that it is filled with a calibration solution containing the same standard dye that is used in preparing the solution in vial 15 except that its concentration or color density is increased so as to be more energy absorptive when exposed to the light rays of a spectrophotometer. The color density of the solution in vial 20 is predetermined, but since it is greater than that of the solution in vial 15, a higher spectrophotometer reading will be obtained when vial 20 is placed in the spectrophotometer. The reference indicia 21 on vial 20 thus will be the letter "B". Vial 20 is also provided with a stopper 22 and a sealing cap 23.

Still another calibration vial 25 is provided and it is filled with a calibration solution containing a predetermined quantity of the standard dye dissolved in the diluent, but the solution is more concentrated than that in vial 20. A still higher reading on a spectrophotometer will be obtained when the solution in vial 25 is analyzed because of its greater color density. Accordingly, the reference indicia 26 on vial 25 will be the letter "C". The vial, as the other calibration vials, is provided with a stopper 27 and a sealing cap 28.

The dye used in preparing the colored solutions in standard calibration vials 15, 20, and 25 is amido naphthol red G, which is also known as acid red 1. The dye concentration in each of the vials is as follows: vial 15 (standard calibration vial "A") concentration is 5.0 micrograms/milliliter of diluent; vial 20 (standard calibration vial "B") concentration is 15.0 micrograms/milliliter of diluent; and vial 25 (standard calibration vial "C") concentration is 25.0 micrograms/milliliter of diluent. The diluent, as noted above, is 10% methyl alcohol and it is used in vial 10 (standard calibration vial "0") without the addition of any dye.

The kit also includes at least one pipette calibration vial 30 which is the same as the vials hereinabove described. However, vial 30 is filled with a predetermined volume of 10% methyl alcohol, the diluent referred to above. In the preferred embodiment, calibration vial 30 contains 5.0 milliliters of the diluent. A stopper 31 and a readily removable sealing cap 32 are provided for the vial. The kit generally will include a plurality of filled vials 30 since each pipette calibration requires the use of the contents of a vial.

There next is provided a bottle 35 filled with a standard dye reagent having a predetermined concentration of acid red 1 dye dissolved in a 10% methyl alcohol diluent. The bottle is provided with a removable screw cap 36 since only a portion of the reagent will be used for each pipette calibration procedure. In fact, it is intended that pipettes having a wide range of rated volumes be calibratable with the present kit, and therefore additional bottles, each filled with a standard reagent having a different predetermined dye concentration, will be provided. It is contemplated that pipettes having rated capacities from 10 lambda (i.e., 10 microliters) to 1000 lambda can be calibrated with the material supplied in the pipette calibration kit. For larger capacity pipettes, standard reagents having a lower dye concentration, i.e., a lower color density, will be provided. The reason for this will be apparent as the description proceeds. Since a number of bottles similar to bottle 35 are provided, each containing a standard reagent of a different color density, each bottle will be marked with an indicia 37 to indicate the pipette volume range for which it is to be used. Thus bottle 35 may be marked with the indicia "I" to indicate that the reagent therein is to be used when calibrating a pipette having a rated capacity between 10 and 50 lambda. Of course, the bottle may also be marked with the information "10–50 Lambda". Bottle 38 may be marked with the indicia "II" to indicate that the reagent therein is to be used when calibrating a pipette having a rated capacity between 51 and 250 lambda, and bottle 39 marked with the indicia "III" to indicate that the reagent therein is to be used when calibrating a pipette having a rated capacity between 251 and 1000 lambda.

The dye concentrations of the standard reagents in bottles 35, 38, and 39 are 2500 micrograms/milliliter of diluent, 500 micrograms/milliliter of diluent, and 100 micrograms/milliliter of diluent, respectively. As noted before, the dye is acid red 1 and the diluent is 10% methyl alcohol. Thus, it is clear that the dye concentrations of the standard reagents are greater than those previously specified for the dye solutions contained in vials 15, 20, and 25.

Attention is now directed to FIG. 2 which depicts a sheet of graph paper 40 on which a calibration curve may be drawn. The ordinate scale of the graph paper is designated "Absorbance at 515 nm." with scale values ranging from 0.1 to 1.0. The abscissa scale of the paper is designated "Delivered Volume in Lambda" and it is given, for example, three different scale values. Thus, the abscissa scale is marked "Range I" with values from 10 to 50, "Range II" with values from 51 to 250, and "Range III" with values from 251 to 1000. Of course, separate sheets of graph paper 40 could be provided for each of the indicated ranges. It will be noted now that the particular range used or read will depend on the volume capacity of the pipette being calibrated, and this in turn will determine which bottle of standard reagent will be used in the calibration procedure. Thus, if a pipette having a capacity between 10 and 50 lambda is being calibrated, then "Range I" of the graph paper will be used and the standard reagent in bottle 35 marked with the indicia "I" will be used in the calibration procedure. If a pipette having a capacity between 51 and 250 lambda is being calibrated, then "Range II" of the graph paper will be used and the standard reagent in bottle 38 marked with the indicia "II" will be used to calibrate the pipette. The abscissa scale of graph paper 40 is also marked with the indicia "A", "B", and "C". These markings correlate, in a manner later to be described, with the solutions in vials 15, 20, and 25 which have been marked "A", "B", and "C", respectively.

The kit components heretofore described will be used to calibrate a pipette in accordance with the method now set forth. The laboratory's spectrophotometer should be warm and ready for operation. The wavelength should be set for 515 nanometers (nm.). This particular wavelength is selected because the dye used in preparing the solutions in the kit, acid red 1, has a color spectrum that is most stable at 515 nm. Thus, the accuracy of the calibration procedure will be minimally affected by slight shifts in the spectrophotometer set point. For example, if the spectrophotometer shifts slightly, 10–15 nm above or below 515 nm, it will have no material effect on the calibration. If using the same dye, the spectrophotometer is set at 560 nm, a 10–15 nm shift could result in calibration errors of 65% to 75%. It should be noted that the 515 nm set point is determined by the particular dye used, and a different dye having a different spectrum would require a different set point.

With the spectrophotometer wavelength set at 515 nm, vial 10 with the clear diluent therein is placed in the spectrophotometer and the output reading is set to zero absorbance. Next, vial 15 with the "A" solution therein is placed in the spectrophotometer and the resultant absorbance reading is marked on graph paper 40 over the abscissa marked "A". This procedure is followed with vials 20 and 25 and the spectrophotometer readings are recorded on paper 40 over the abscissas marked "B" and "C", respectively. See FIG. 3. The points marking the three readings are connected by straight lines. Thus the readings for the "A" and "B" solutions are connected by a straight line, as are the readings for the "B" and "C" solutions. Although the three readings should fall along a single straight line and only two readings should be required, the preferred embodiment utilizes three readings because there may be a slight non-linear response in the spectrophotometer.

Assuming that a forty lambda pipette is being calibrated, the technician takes one vial 30 containing a predetermined volume of diluent and carefully removes sealing cap 32 and stopper 31. Using the pipette being calibrated, a sample of liquid is withdrawn from vial 30 and discarded. Then a sample of standard reagent is withdrawn from bottle 35 marked with the indicia "I" and dispensed into the diluent remaining in vial 30. The stopper 31 is then replaced in vial 30 and the contents thereof thoroughly mixed.

Vial 30 is then placed in the spectrophotometer and the absorbance reading noted and recorded on the straight line curve drawn on paper 40. Then, by reading the abscissa for the point where the absorbance ordinate intersects the straight line calibration curve, the volume capacity of the pipette is noted. If the deviation between the nominal capacity of the pipette and the tested capacity exceeds acceptable tolerances, and if the pipette is provided with a calibrating adjustment means, the pipette can be adjusted and its calibration re-checked. The adjustment of the pipette and its re-calibration can be repeated until the delivered volume accords with the nominal capacity of the pipette or falls within acceptable tolerances therefrom.

If a larger capacity pipette, e.g., 150 lambda, is being calibrated, the same procedure would be followed except that standard reagent from bottle 38 marked "II" would be used. Since a larger volume of liquid would be withdrawn from a vial 30 and replaced by the same larger volume of reagent from bottle 38, and since the same curve drawn from the spectrophotometer readings for vials 15, 20, and 25 containing standard solutions "A", "B", and "C" is used, it is clear that the concentration of the dye in reagent "II" and its color density will be less than that of reagent "I". By the same token, reagent "III" will be less concentrated and less color dense than reagent "II". The dye concentrations of the various solutions have been specified hereinabove.

Although the preferred embodiment of the invention employs the colorimetric calibration method disclosed, it should be understood that the same method utilizing other materials and measuring instruments could be used in calibrating pipettes. For example, using a fluorescent material such as rhodamine B instead of a dye for the calibration solutions and the reagents, and distilled water with ½% sodium azide as the diluent, the same concentrations and method hereinabove disclosed could be used in conjunction with a fluorometer.

Instead of measuring the absorbance of a dye solution or the fluorescence of a fluorescent solution to determine the volume of a reagent introduced into a known volume of a diluent, the hydrogen ion concentration of a solution could be measured in a ph meter for the same purpose. The calibration solutions could each be buffered to a different ph, e.g., ph 9, ph 7, ph 5, and ph 3. The reagents, which would be used to replace an equal volume of deionized water (the diluent) in the calibration vials, would be acetic acid solutions of 2.5 molar, 0.5 molar, and 0.1 molar concentrations. These would correspond to the dye reagents in bottles 35, 38, and 39, respectively. The hydrogen ion concentration of the calibration solutions would be read on a ph meter to plot a calibration curve similar to the one plotted using the colorimetric method. Then, depending on the nominal capacity of the pipette being calibrated, one of the acetic acid reagent bottles would be selected and the pipette used to remove a volume of deionized water from the calibration vial and replace it with an equal volume of the selected reagent. The ph of the acid solution in the calibration vial would be measured and compared to the calibration curve to determine the exact volume of the pipette being calibrated.

Instead of the materials and measuring instruments disclosed, the same method of calibrating pipettes could be followed using electrical conductance measurements. Thus, salt solutions could be used for the calibration and reagent solutions and a microammeter for the measuring instrument.

Having thus described the invention, it is clear that many variations from the preferred embodiment can be effected without departing from the spirit or scope of the invention. For example, the zero reference vial 10 may be omitted and a calibration vial 30 containing the diluent (which is the same solution as that in vial 10) may be used to set the zero setting of the spectrophotometer. Also, a single calibration vial, e.g., vial 25, may be used to obtain an absorbance reading and the calibration curve established by drawing a straight line between that point and the origin of the graph paper 40. Therefore, it is intended that the specification and the drawing be interpreted as illustrative rather than in a limiting sense.

What is claimed is:

1. A pipette calibration kit comprising a first vial containing a first solution comprising a solute and a solvent having a measurable first predetermined concentration, said first vial bearing an indicia related to that concentration, a second vial containing a second solution similar to said first solution but having a measurable second concentration different from that of said first solution, said second vial bearing an indicia related to the concentration of said second solution, graph means having absorbance values marked along one coordinate axis and volume values marked along a second coordinate axis, said second coordinate axis also containing indicia markings corresponding to those of said first and said second vials, so that a measured absorbance of a solution in a vial can be plotted in alignment with the graph means indicia markings corresponding to the indicia on the vial and a calibration curve drawn, a bottle containing a reagent solution similar to said first solution but having a predetermined concentration greater than that of said first and said second solutions, and a vial containing a predetermined volume of a diluent comprising the same solvent as in said first solution, whereby a part of said diluent can be removed from said diluent vial by a pipette that is to be calibrated and replaced by an equal part of the reagent solution pipetted from said reagent bottle and dispensed into the diluent vial by the pipette being calibrated to provide a solution having a measurable absorbance value from which the volume capacity of the pipette being calibrated can be determined from a calibration curve plotted on said graph means.

2. A pipette calibration kit according to claim 1 wherein said first and second vials and said diluent vial are adapted to be analyzed in a measuring instrument.

3. A pipette calibration kit according to claim 1 wherein said first and second vials and said diluent vial are provided with sealing means to secure the integrity of the contents thereof.

4. A pipette calibration kit according to claim 3 wherein the diluent vial sealing means is removable.

5. A pipette calibration kit according to claim 1 including a third vial containing a third solution similar to said first and second solutions but having a measurable third predetermined concentration different from that of said first and second solutions, said third vial bearing an indicia related to the concentration of said third solution, and a second bottle containing a second reagent solution similar to said reagent solution but having a predetermined concentration different from that of the reagent solution, wherein said reagent bottles bear indicia related to the concentrations of the solutions therein and wherein said second coordinate of said graph means includes indicia corresponding to that of said reagent bottles and a third indicia mark corresponding to that of said third solution vial.

6. A pipette calibration kit according to claim 5 including a fourth vial containing a zero reference solution which is the same as the solvent in said first solution and bearing an indicia indicative thereof, wherein said first, second, third, and fourth vials are adapted to be placed in a measuring instrument that provides an indication of the concentration of the solutions therein, and wherein said zero reference solution is provided to set the measuring instrument to give a zero indication.

7. A pipette calibration kit comprising a first vial containing a first dye solution having a measurable first predetermined dye concentration, said vial bearing an indicia related to that concentration, a second vial containing a second dye solution similar to said first dye solution but having a second predetermined dye concentration different from that of said first dye solution, said second vial bearing an indicia related to the concentration of said second dye solution, graph means having absorbance values marked along one coordinate axis and volume values marked along a second coordinate axis, said second coordinate axis also containing indicia markings corresponding to those of said first and second vials so that a measured dye absorbance of a solution in a vial can be plotted in alignment with the graph means indicia corresponding to the indicia on the vials and a calibration curve drawn, a bottle containing a reagent dye solution similar to said first dye solution but having a predetermined dye concentration greater than that of said first and said second dye solutions, and a vial containing a predetermined volume of the diluent used in preparing the aforesaid dye solutions, whereby a part of said diluent can be removed from said diluent vial by a pipette that is to be calibrated and replaced by an equal part of the reagent dye solution pipetted from said reagent bottle and dispensed into the diluent vial by the pipette being calibrated to provide a solution having a dye absorbance value from which the volume capacity of the pipette being calibrated can be determined from a calibration curve plotted on said graph means.

8. A pipette calibration kit according to claim 7 wherein said first, second, and diluent vials are adapted to permit the absorbance values of the solutions therein to be determined in a spectrophotometer.

9. A pipette calibration kit according to claim 8 including instructions for setting the spectrophotometer for the wavelength at which the color spectrum of the dye solution is most stable.

10. A pipette calibration kit according to claim 9 wherein the dye solutions contain amido naphthol red G and the spectrophotometer instructions call for a wavelength setting of 515 nm.

11. A pipette calibration kit according to claim 7 including a third vial containing a third dye solution similar to said first dye solution but having a measurable third predetermined dye concentration different from that of said first and second dye solutions, said third vial bearing an indicia related to the concentration of said third dye solution, and wherein said second coordinate of said graph means includes a mark corresponding to the indicia on said third vial.

12. A pipette calibration kit according to claim 11 including a second bottle containing a second reagent dye solution similar to said reagent dye solution but having a predetermined dye concentration different from that of the reagent dye solution, and wherein said reagent bottles bear indicia related to the concentrations of the solutions therein and wherein said second coordinate of said graph means includes indicia corresponding to that of said reagent bottles.

13. A pipette calibration kit according to claim 12 including a third vial containing a dye solution having a measurable third predetermined dye concentration and bearing an indicia related to that concentration, and wherein said second coordinate of said graph means includes a mark corresponding to the indicia on said third vial.

14. A pipette calibration kit according to claim 15 including a fourth vial containing a diluent having a zero absorbance characteristic and bearing an indicia indicative thereof, wherein said fourth vial is used to set a spectrophotometer for zero absorbance.

* * * * *